US008307804B2

(12) United States Patent
Ohta (10) Patent No.: US 8,307,804 B2
(45) Date of Patent: Nov. 13, 2012

(54) OIL PASSAGE STRUCTURE OF ENGINE

(75) Inventor: Hidekuni Ohta, Shizuoka (JP)

(73) Assignee: Suzuki Motor Corporation (JP)

( * ) Notice: Subject to any disclaimer, the term of this patent is extended or adjusted under 35 U.S.C. 154(b) by 441 days.

(21) Appl. No.: 12/554,494

(22) Filed: Sep. 4, 2009

(65) Prior Publication Data
US 2010/0083931 A1 Apr. 8, 2010

(30) Foreign Application Priority Data

Sep. 11, 2008 (JP) ................................. 2008-233919

(51) Int. Cl.
*F01M 1/02* (2006.01)
*F01M 11/02* (2006.01)
(52) U.S. Cl. ................... 123/196 R; 123/197.4; 184/6.5
(58) Field of Classification Search .............. 123/196 R, 123/197.4; 184/6.5
See application file for complete search history.

(56) References Cited

U.S. PATENT DOCUMENTS

| | | | | |
|---|---|---|---|---|
| 2,754,814 | A * | 7/1956 | Hopwood | 123/196 R |
| 5,964,198 | A * | 10/1999 | Wu | 123/196 R |
| 6,334,422 | B1 | 1/2002 | Sumi et al. | |
| 6,536,400 | B1 * | 3/2003 | Inumaru et al. | 123/196 R |
| 6,715,460 | B2 * | 4/2004 | Ashida et al. | 123/196 R |
| 6,935,298 | B2 * | 8/2005 | Ueshima et al. | 123/196 R |
| 7,100,562 | B2 * | 9/2006 | Terada et al. | 123/195 R |
| 7,314,115 | B2 * | 1/2008 | Ito et al. | 184/6.5 |
| 7,350,498 | B2 * | 4/2008 | Matsuda | 123/196 R |
| 7,363,904 | B2 * | 4/2008 | Utsumi et al. | 123/196 R |
| 7,464,685 | B2 * | 12/2008 | Hochmayr et al. | 123/195 R |
| 7,493,756 | B2 * | 2/2009 | Mizuno et al. | 60/339 |
| 7,954,600 | B2 * | 6/2011 | Ohta | 184/6.5 |
| 8,083,045 | B2 * | 12/2011 | Takano | 192/105 CD |
| 2006/0157004 | A1 | 7/2006 | Gunji et al. | |
| 2008/0025658 | A1 * | 1/2008 | Hochmayr et al. | 384/457 |
| 2008/0149423 | A1 * | 6/2008 | Jankuski | 184/6.5 |

FOREIGN PATENT DOCUMENTS

| | | |
|---|---|---|
| DE | 844 370 C | 7/1952 |
| EP | 1 026 371 A1 | 8/2000 |
| EP | 1 571 302 A1 | 9/2005 |
| JP | 56-15406 U | 2/1981 |
| JP | 61-134519 U | 8/1986 |
| JP | 5-263616 A | 10/1993 |
| JP | 2002-195097 | 7/2002 |
| JP | 2003-254417 A | 9/2003 |
| JP | 2005-273632 A | 10/2005 |
| JP | 2006299830 A | 11/2006 |

OTHER PUBLICATIONS

EP Official Communication dated May 9, 2012 for EP Application No. 09 169 700.3. EP Application 09 169 700.3 is the corresponding EP application to the instant U.S. Appl. No. 12/554,494. JP Official Communication dated Aug. 7, 2012 for JP Application No. 2008-233919. JP Application No. 2008-233919 is the corresponding JP application to the instant U.S. Appl. No. 12/554,494.

* cited by examiner

*Primary Examiner* — Noah Kamen
*Assistant Examiner* — Grant Moubry
(74) *Attorney, Agent, or Firm* — Troutman Sanders LLP (57) ABSTRACT

An oil passage structure of an engine including a crankshaft having an oil feed passage opened at a first end thereof, an oil passage in communication with the oil feed passage and an oil discharge passage in communication with a downstream end of the oil passage that is opened at a second end of the crankshaft. The oil passage allows therethrough feeding of oil to the ends of connecting rods that are coupled to the crankshaft.

10 Claims, 7 Drawing Sheets

OIL PASSAGE STRUCTURE OF ENGINE

CROSS-REFERENCE TO RELATED APPLICATIONS

This application is based upon and claims the benefit of priority of the prior Japanese Patent Application No. 2008-233919, filed on Sep. 11, 2008, the entire contents of which are incorporated herein by reference.

BACKGROUND OF THE INVENTION

1. Field of the Invention

The present invention relates to an oil passage structure of an engine of vehicle, particularly motor-bicycle or the like, which has a piston reciprocating in each of a plurality of cylinders, a crankshaft rotatably supported in a crankcase, and a connecting rod coupling each piston to the crankshaft.

2. Description of the Related Art

For engines, particularly those having four or more cylinders, there has been known a method of stabilizing, in an oil passage structure of a crankshaft, oil feed to big ends of connecting rods which are supported by plain bearings, such as providing an oil feed port to the end of the crankshaft, so as to configure the oil passage towards the big ends of the connecting rods as independent paths.

Japanese Laid-Open Patent Publication No. 2006-299830 discloses an analogous oil passage structure in this sort of engines.

In the conventional techniques, it has however been necessary to configure a relatively long oil passage in the crankshaft. Accordingly, the air undesirably remain therein may cause so-called air entrainment if no countermeasure is taken, and may seize the big ends of the connecting rods.

Substantially no consideration is paid on a viewpoint of air bleeding in the structure described in Japanese Laid Open Patent Publication No. 2006-299830.

SUMMARY OF THE INVENTION

Considering the above-described situations, it is therefore an object of the present invention to provide an oil passage structure capable of effectively and efficiently ensuring excellent lubricating performances.

According to the present invention, there is provided an oil passage structure of an engine which has a plurality of cylinders and a crankcase, and further includes pistons reciprocating in the cylinders, a crankshaft rotatably supported in the crankcase, and connecting rods coupling the pistons with the crankshaft, wherein the crankshaft has: an oil feed passage opened at one end thereof; an oil passage engaged with the oil feed passage, and allowing therethrough, feeding of an oil to the big ends of the connecting rods; and an oil discharge passage communicated with the downstream end of oil path of the oil passage, and opened at the other end of the crankshaft.

In the oil passage structure of the present invention, the crankshaft has a fastening bolt fastened at the other end thereof, and the oil discharge passage is formed in the fastening bolt.

In the oil passage structure of the present invention, the fastening bolt has, at the head portion thereof, an opening of the oil discharge passage, and the cross-sectional area of the opening is set smaller than the cross-sectional area of the oil discharge passage.

In the oil passage structure of the present invention, the fastening bolt is provided for fastening an object to be attached to the other end of the crankshaft, and has at least any one of a cam chain sprocket, a starter clutch, and a AC generator as the object to be attached.

In the oil passage structure of the present invention, the oil discharge passage opens so as to be opposed with the inner surface of a cover component which externally covers the other end of the crankshaft.

In the oil passage structure of the present invention, the crankshaft is fastened, on one end thereof, with an engine accessory by a fastening bolt, the fastening bolt for fastening the engine accessory has the oil feed passage formed therein, and the fastening bolt for fastening the engine accessory is communicated, at the head thereof, with an oil reservoir provided to an engine accessory cover which covers the engine accessory.

In the oil passage structure of the present invention, the oil discharge passage has an opening which opens on the outer circumferential surface of the other end of the crankshaft, and the opening is externally covered with the cam chain sprocket which is attached to the other end of the crankshaft, and is communicated with an air-bleeding hole which is formed in the cam chain sprocket.

In the oil passage structure of the present invention, the opening and the air-bleeding hole are disposed coaxially, and the cross-sectional area of the air-bleeding hole is set smaller than the cross-sectional area of the opening.

In the oil passage structure of the present invention, the center axis of the opening and the center axis of the air-bleeding hole are offset, and the cross-sectional area of the communicated portion of the opening and the air-bleeding hole is set smaller than the cross-sectional area of the opening.

According to the present invention, an oil fed from one end of the crankshaft flows through the oil passage in the crankshaft, and discharged through the oil discharge passage out from the opening. As a consequence, when an oil feed structure based on the crank-end lubrication system is adopted in multi-cylinder engines, the air entrained in the oil passage may reliably be discharged.

In this configuration, the oil discharge passage is formed making use of an attachment bolt and is formed therein. In particular, by preliminarily obtaining a plurality of types of attachment bolts having different cross-sectional areas of the oil discharge passage, any possible modifications in the specification with respect to air-bleeding performance and amount of oil discharge may flexibly be coped with.

In addition, the cross-sectional area of the opening is set smaller than the cross-sectional area of the oil discharge passage, and thereby the diameter of the air-bleeding hole may be shrunk. Since the amount of oil discharge may be adjustable, and in particular reducible, so that the crank pin bearings may be supplied with a necessary-and-sufficient amount of oil, and thereby any lubrication failure of the crank pin bearings may always be prevented.

DETAILED DESCRIPTION OF THE PREFERRED EMBODIMENTS

Preferable embodiments of the an oil passage structure of engine according to the present invention will be explained below, referring to the attached drawings.

Figure 1:
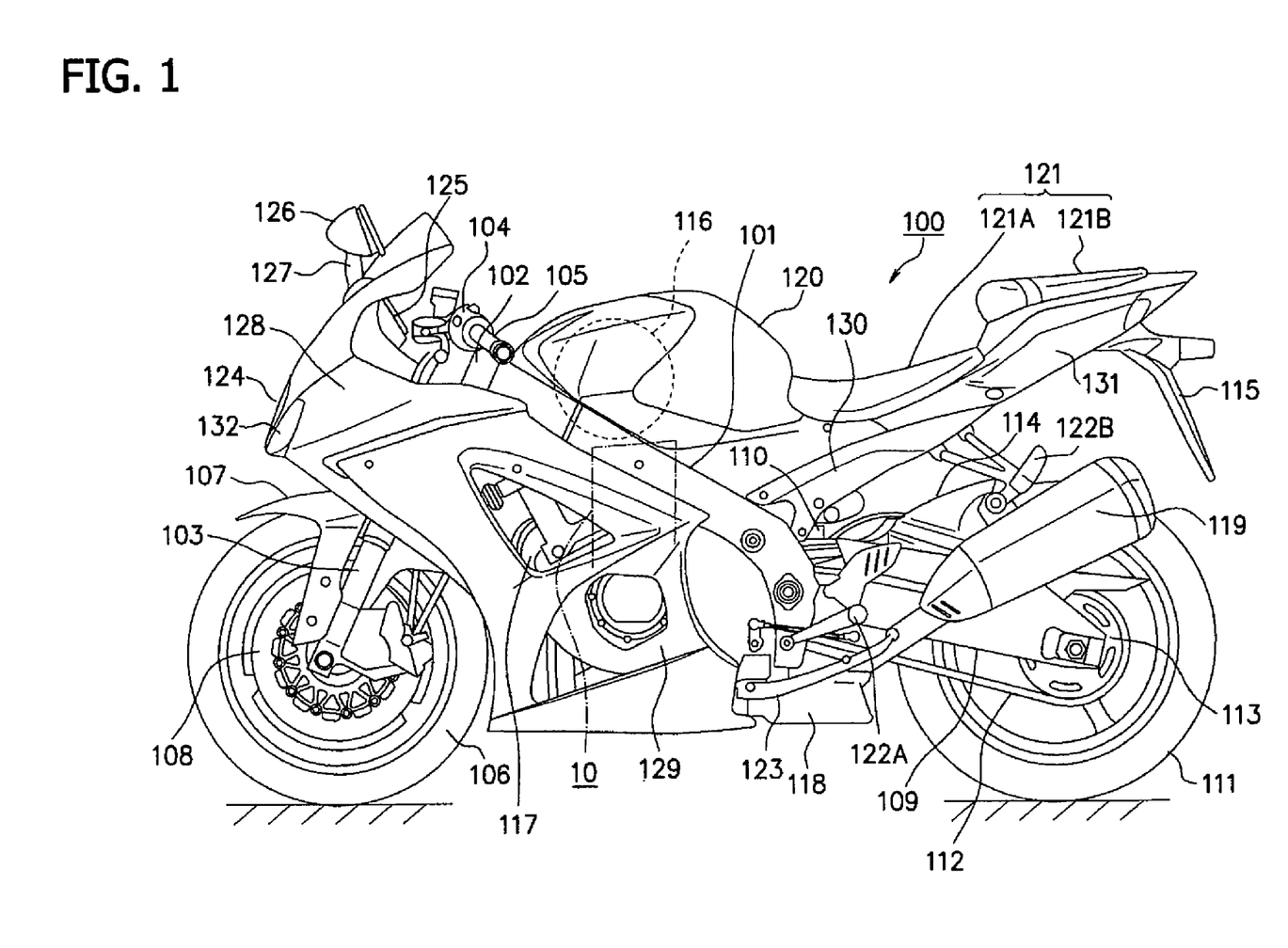
FIG. 1 is a side elevation illustrating an exemplary overall configuration of a motor-bicycle according to an embodiment of the present invention.

The oil passage structure of engine according to the present invention may appropriately be adoptable to various types of gasoline engines to be mounted on motor-bicycles and four-wheeled vehicles. This embodiment will deal with an exemplary case of an engine of motor-bicycle, as illustrated in FIG. 1.

The description herein will begin with an overall configuration of a motor-bicycle 100 of this embodiment. As illustrated in FIG. 1, a body frame 101 made of an aluminum alloy is provided with, in the front portion thereof, two left and right front forks 103 which are laterally and swingably supported by a steering head pipe 102. At the top ends of the front forks 103, a steering bar 104, having grips 105 on both ends thereof, is fixed. At the lower portion of the front forks 103, a front wheel 106 is rotatably supported in between, and a front fender 107 is fixed thereto so as to cover the upper portion of the front wheel 106. The front wheel 106 has a brake disk 108 which rotates together therewith.

The body frame 101 forks from the steering head pipe 102 rearwardly into two branches on the left and on the right, each of which extends so as to incline downward. The body frame 101 is coupled, at the rear end thereof, with a swing arm 109 in a swingable manner, while placing a rear shock absorber 110 laid across the both. At the rear end of the swing arm 109, a rear wheel 111 is supported in a rotatable manner. The rear wheel 111 is configured to rotate while being mediated by a driven sprocket 113 having a chain 112, which transmits motive force of an engine described later, wound around. In the close vicinity of the rear wheel 111, there are provided an inner fender 114 disposed so as to cover the front upper portion thereof, and a rear fender 115 disposed thereabove.

An engine unit 10 (indicated by a dashed line) mounted on the body frame 101 is fed with a fuel mixture from a fuel injector 116, and an exhaust gas after combustion in the engine is discharged through exhaust pipes 117. In this embodiment, the engine may be configured as a four-cycle, multi-cylinder (4-cylinder) engine, for example. The exhaust pipes 117 of the individual cylinders are coupled with the engine unit 10 on the lower side thereof. The exhaust gas is then discharged through an exhaust chamber 118, out from a muffler 119, at around the rear end of the vehicle body.

Above the engine unit 10, there is mounted a fuel tank 120, and a seat 121 (rider's seat 121A and tandem seat 121B) placed in a row. Foot rests 122A, 122B are disposed corresponding to the rider's seat 121A and the tandem seat 121B, respectively. In this exemplary configuration, a prop stand 123 is provided on the lower left side of the vehicle body, nearly at the center of the longitudinal direction. The fuel injector 116 is compactly housed in a recess inside the fuel tank 120, while being located above the engine unit 10.

In FIG. 1, reference numeral 124 stands for a head lamp, 125 for a meter unit which includes a speed meter, a tachometer or various indicators, and 126 for a rear-view mirror which is supported by a stay 127 on a fairing 128.

As for the exterior of the vehicle, the fairing 128 and the side cowl 129 cover mainly the front portion and side portions of the vehicle, and a side cover 130 and a seat cowl 131 are attached to the rear portion of the vehicle. These components form a so-called streamline appearance of the vehicle. Among these, the fairing 128 has, at the front end thereof, an air intake 132 which composes a part of the fuel injector 116 and allows therethrough air supply to an air cleaner (not illustrated).

Figure 2:
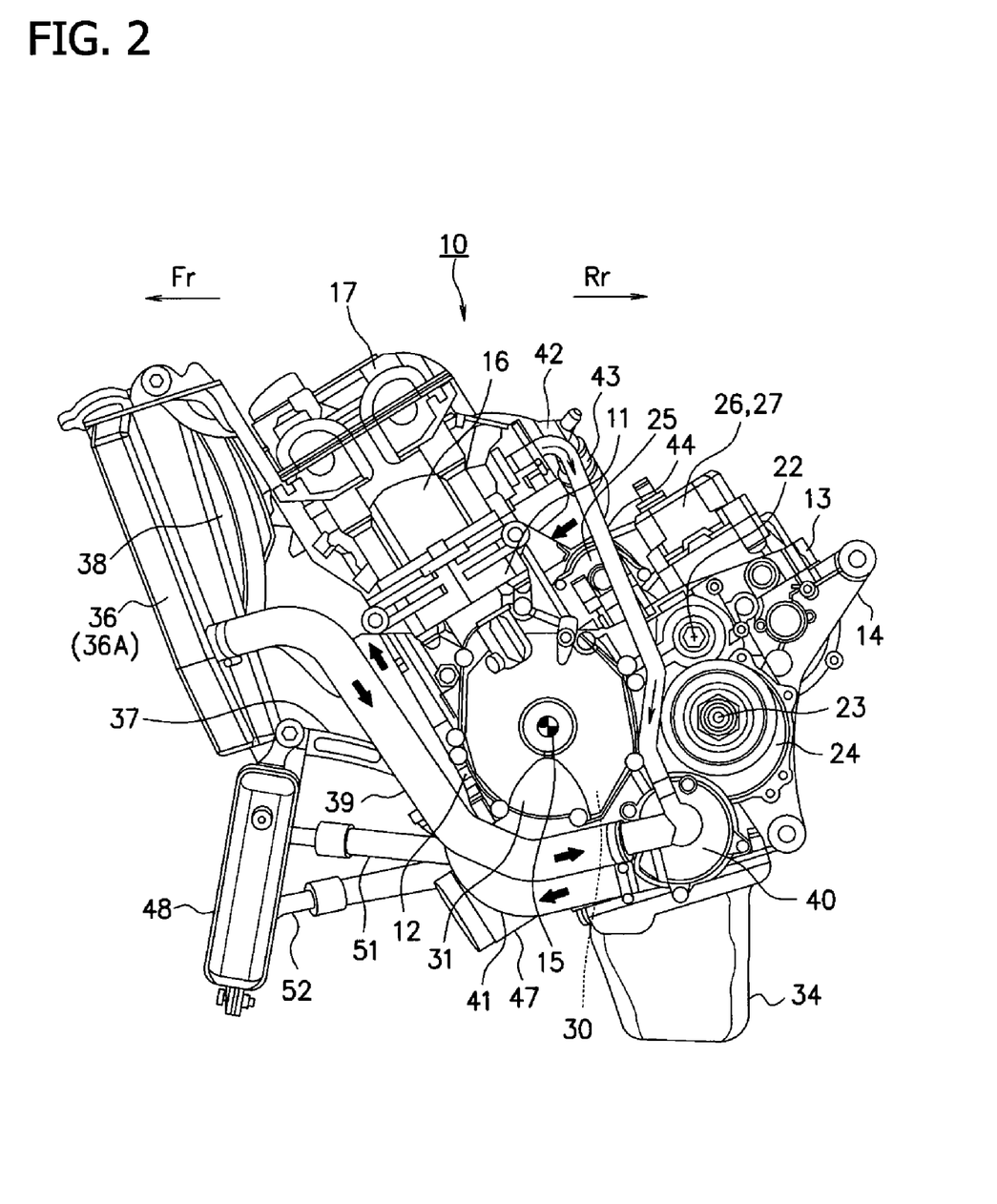
FIG. 2 is a left side elevation of an engine unit according to the present invention.
Figure 3:
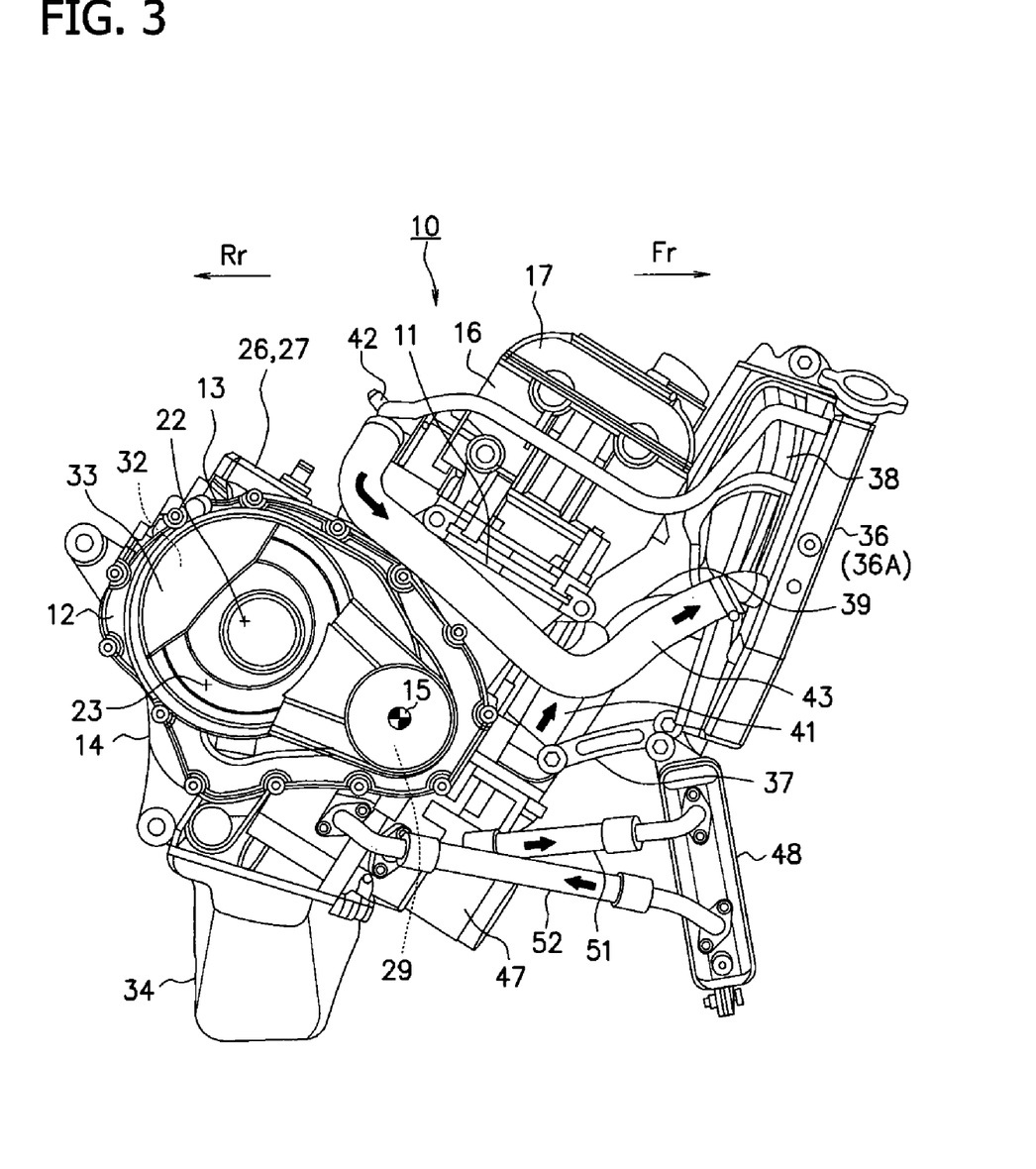
FIG. 3 is a right side elevation of the engine unit according to the present invention.
Figure 4:
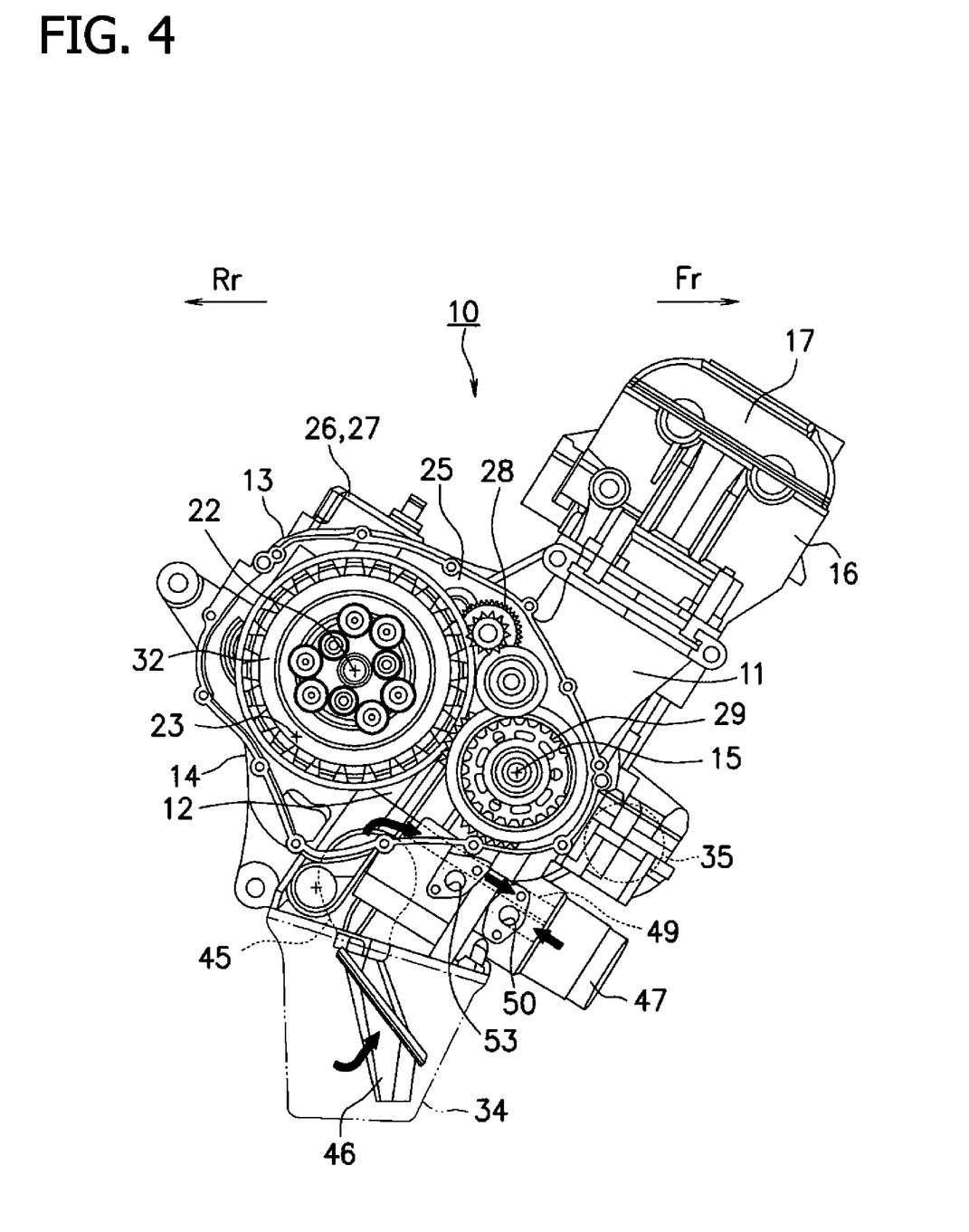
FIG. 4 is a right side elevation illustrating a partial internal structure of the engine unit according to the present invention.

Next, FIGS. 2 to 4 illustrate an exemplary configuration of the engine unit 10 and the peripherals of this embodiment. The engine unit 10 is supported by the body frame 101, so as to be moderately inclined towards the front (the front and the rear are indicated by arrows Fr and Rr, respectively). At the center lower portion of the vehicle body of the motor-bicycle 100 and below the fuel tank 120, there is disposed a four-cycle, water-cooled parallel 4- or 6-cylinder engine unit 10, as illustrated in FIG. 2. In the engine unit 10, a cylinder block 11 having a plurality of cylinders integrated therein is disposed over a crankcase 12 while being slightly inclined towards the front, so as to extend in the width-wise direction of the vehicle. In the illustrated configuration, the engine unit 10 may be of four-cylinder type, and more specifically, a parallel multi-cylinder engine of side cam chain type, having the individual cylinders mounted slightly inclined from the vertical direction towards the front. In particular in this case, the cylinder block 11 is formed by an aluminum die cast while being integrated with (a part of) the crankcase 12, as described later.

The engine unit 10 is further attached or mounted with attachments and accessories which include a fuel feed unit, an intake unit, an exhaust unit and a cooling unit. More specifically, air purified by an air cleaner housed in the inner recess of the fuel tank 120 (FIG. 1) is supplied to an intake port. The amount of air supplied to the intake port is controlled by a throttle valve. The intake port is also configured to be injectively supplied with fuel by an injector.

As described in the above, the cylinder block 11 has, on the front side thereof, the exhaust pipes (the exhaust pipes 117 in FIG. 1; having 4 or 6 exhaust pipes in this example) which compose the exhaust unit connected thereto, and the muffler 119 connected further on the downstream side thereof. Note that the explanation below will deal with only essential attachments and accessories of the engine unit 10.

As illustrated in FIGS. 2 to 4, the crankcase 12 is configured by an upper crankcase 13 which is integrated with the cylinder block, and a lower crankcase 14. They are the upper and lower halves combined with each other, and support the individual shafts, including a crankshaft 15, at the mating face therebetween. The rear half of the crankcase 12 is also allowed for use as a transmission case, in which transmission gears are housed. The upper crankcase 13 integrated with the cylinder block 11 has a cylinder head 16 and a cylinder head cover 17 disposed at the upper portion thereof. A combustion chamber formed so as to be matched with the cylinder bore is provided to the lower face of the cylinder head 16.

In the cylinder head 16, an intake port and an exhaust port are formed so as to be communicated with the combustion chamber. The cylinder head 16 has, formed therein, an intake valve which controls opening/closing of the intake port, and an exhaust valve which controls opening/closing of the exhaust port, which are driven by an intake-side cam and an exhaust-side cam, respectively.

Figure 5:
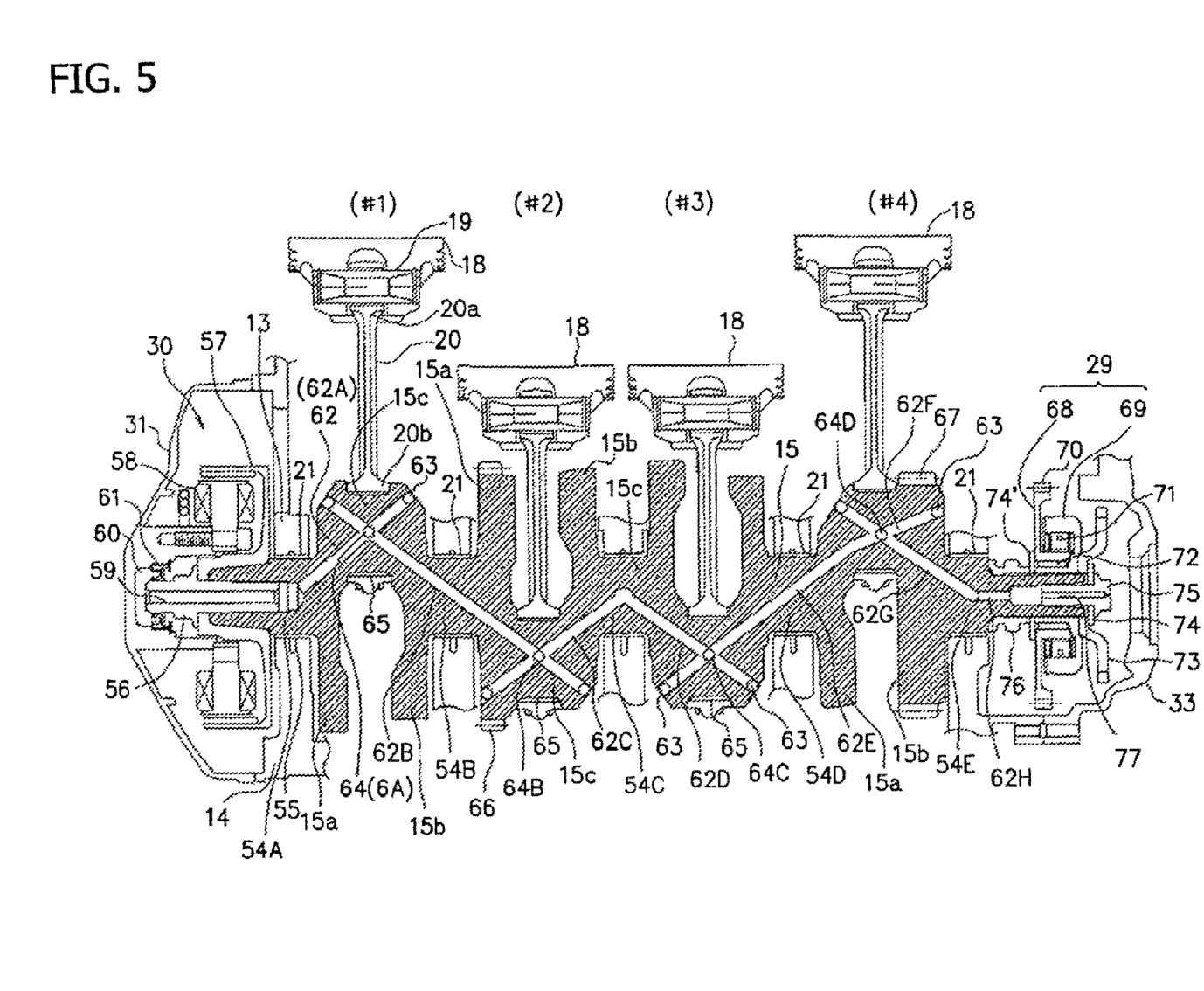
FIG. 5 is a sectional view of the engine unit of the present invention taken along the crankshaft.

In each of the cylinders in the cylinder block 11, a piston is engaged in the cylinder bore thereof in a slidable manner. Referring now to FIG. 5, the piston 18 is coupled via a piston pin 19 with a small end 20a of a connecting rod 20. On the other hand, the big end 20b of the connecting rod 20 is coupled with a crank pin 15c formed between crank webs 15a, 15b provided in a paired manner to the crankshaft 15 as illustrated in FIG. 5. By coupling the crankshaft 15 and the pistons 18 in this way, reciprocating motion of the pistons 18 is converted by way of the connecting rod 20 into rotational motion of the crankshaft 15, and thereby an engine output may be obtained.

The crankshaft 15 is disposed in the crankcase 12 so as to be laid in the width-wise direction of the vehicle, and is rotatably supported by journal bearings 21 set on the mating face between the upper crankcase 13 and the lower crankcase 14.

In the cylinder block 11, a water jacket is formed around each cylinder, through which cooling water supplied from a water pump is allowed to flow as described later. The individual cylinders may be so-called plated cylinders, and may have no cylinder liners (sleeves).

On the rear half of the crankcase 12, as illustrated typically in FIG. 2, a counter shaft 22 and a drive shaft 23 are disposed in parallel with the crankshaft 15. Between the counter shaft 22 and the drive shaft 23, there is provided, for example, a transmission unit which typically composes a six-speed mechanism, so as to transmit rotation of the counter shaft 22 to the drive shaft 23, after being shifted up or down by the transmission unit. The drive shaft 23 has, at the end thereof, a drive sprocket 24 (FIG. 2) attached thereto. A chain 112 is wound across the driven sprocket (FIG. 1) which is attached to the axle of the rear wheel 111, and the drive sprocket 24, so as to form a power transmission path from the engine unit 10 to the rear wheel 111.

In the upper crankcase 13, above the transmission unit and on the rear side of the cylinder block 11, there is mounted a starting motor 25. On the rear side of the starting motor 25, there is further disposed a breather chamber which composes a part of an oil lubrication system, and breather covers 26, 27 therefor. The starting motor 25 is coupled with a ring gear 70 (FIG. 5) of a starter clutch device 29 disposed at the right end of the crankshaft 15 as described later, while placing a reduction gear train 28 as illustrated in FIG. 4.

At the left end of the crankshaft 15, there is disposed an AC generator (magneto device) 30 (FIG. 5) which is covered with a magnetocover 31. On the other hand, the starter clutch device 29 disposed at the right end of the crankshaft 15, and the clutch unit 32 disposed at the right end of the counter shaft 22 are covered with a clutch cover 33 as illustrated in FIG. 3. An oil pan 34 is coupled to the lower crankcase 14 at the lower portion thereof, and a secondary balancer 35 is disposed at the lower front crankshaft 15.

Now the cooling system using cooling water in the water-cooled engine unit 10 will be explained. As illustrated in FIG. 2 and FIG. 3, at the front of the cylinder block 11, a radiator 36 which composes the cooling unit is disposed. The radiator body 36A of the radiator 36 is supported, typically with the aid of a stay 37 and so froth, by an appropriate portion of the body frame 101 or the cylinder block 11, and has a fan 38 attached to the back side thereof. The radiator 36 is connected to a water pump 40 described later, through a cooling water piping 39 (on the radiator-OUT side) on the upstream side, and supplies cooled water to the water pump 40.

As illustrated in FIG. 2, the water pump 40 is disposed on the side face of the lower crankcase 14 which is located on the lower rear side of the crankshaft 15. In this embodiment, the water pump 40 is driven by another shaft supplied with motive force from the crankshaft 15 (a pump shaft driven by the counter shaft 22 in the illustrated example). In other words, the pump shaft of an oil pump described later is rotatably disposed between the crankshaft 15 and the counter shaft 22. More specifically, the drive sprocket provided to the end of the pump shaft and the driven sprocket provided to the counter shaft 22 are coupled by the chain, and thereby the oil pump is driven as the counter shaft 22 rotates.

The water pump 40 has a drive shaft coaxially disposed with the pump shaft of the oil pump, and the ends of both shafts are coupled with the aid of a boss/recess engagement structure. In short, the drive shaft of the water pump 40 is configured to rotate in synchronization with the pump shaft of the oil pump. In this configuration, the drive shaft of the water pump 40 has, rotatably attached thereto on one end thereof, an impeller which rotates in a cavity formed by the cover component. The cooling water is discharged and circulated as the impeller rotates. As described in the above, the radiator 36 and the water pump 40 are connected via the cooling water piping 39, wherein the water pump 40 is connected also with a cooling water piping 41 on the downstream side, which supplies the cooling water to the water jacket of the cylinder block 11.

In this configuration, the cylinder block 11 is connected, on the front side thereof, with a cooling water piping 41. The cooling water supplied through the cooling water piping 41 to the water jacket cools the cylinder block 11 and the cylinder head 16, while flowing through the water jacket.

The water jacket is attached, at a cooling water outlet thereof, with a thermostat 42. The thermostat 42 and the radiator 36 are connected by a cooling water piping 43 (on the radiator-IN side). The thermostat 42 turns ON/OFF at a predetermined temperature to open or close a cooling water path, and is configured to return the cooling water back to the water pump 40 side through a by-pass pipe 44, when the cooling water path is closed. In this way, a cooling water system routing through the radiator 36, cooling water piping 39 on the upstream side, the water pump 40, the cooling water piping 41 on the downstream side, the water jacket and the cooling water piping 43, is configured.

Next, an oil lubrication system in the engine unit 10 will be explained. As described in the above, there is provided the oil pump which is driven as the counter shaft 22 rotates, and more specifically, an oil pump 45 is disposed in the lower crankcase 14 as illustrated in FIG. 4. On the other hand, the oil pan 34 has an oil strainer 46 attached therein, thereby the oil accumulated in the oil pan 34 may be pumped up by the oil pump 45 through the oil strainer 46. The oil discharged from the oil pump 45 is supplied to every component of the engine to be lubricated.

In this configuration, the oil cooling unit is provided to cool the lubricating oil. In this embodiment, an oil cooler 48 which is composed as an oil cooling unit is disposed ahead of the cylinder block 11. The oil cooler 48 is supported, typically with the aid of the stay 37 and so froth, by an appropriate portion of the body frame 101 or the cylinder block 11. In this configuration, the oil cooler 48 is configured as of air-cooled type, in which the lubricating oil is cooled to an appropriate temperature while being blown with wind during driving of the vehicle.

The oil pump 45 is connected through an oil passage 49 to an oil filter 47, so that the oil from the oil pump 45 is first supplied to the oil filter 47. The oil purified by the oil filter 47 is then fed through an oil passage 50 to an oil hose 51. The oil hose 51 is connected to the oil cooler 48, and supplies the oil to be cooled to the oil cooler 48. The oil cooler 48 is connected through an oil hose 52 to (a connection port of) a main gallery 53, thereby the oil cooled by the oil cooler 48 is supplied to the main gallery 53, and then supplied to various components of the engine.

The oil lubrication system will further be explained in particular with respect to a lubricating system and a structure around the crankshaft. In this embodiment, there is provided an oil passage structure of so-called, crank-end lubrication system, in which a lubricating oil is supplied from one end of the crankshaft 15. There are provided a plurality of journal portions 54 (first journal portion 54A to fifth journal portion 54E) so as to be disposed on both sides of a plurality of cylinders #1 to #4. The crankshaft 15 is rotatably supported at the individual journal portions 54 while placing the journal bearings 21 in between. The oil is supplied to each journal bearing 21 of each journal portion 54, through a journal portion path 55 which is connected to the main gallery 53.

In the crank-end lubrication system according to the present invention, the crankshaft 15 has an oil feed passage opened at one end thereof, an oil passage communicated with the oil feed passage and allows therethrough supply of the oil to the big ends of the connecting rods, and an oil discharge passage communicated with the downstream end of the oil path of the oil passage and opened at the other end of the crankshaft 15.

For more detail, as illustrated in FIG. 5, the crankshaft 15 has the AC generator 30 as an engine accessory, attached at the left end thereof, as described in the above. The AC generator 30 has a rotor 57 which is fixedly attached to the left end of the crankshaft 15 with the aid of an attaching (or fastening) bolt 56, and a stator coil 58 fixedly attached to the magnetocover 31. The rotor 57 rotates together with the crankshaft 15. The attaching bolt 56 has an oil feed passage 59 which is formed along the center thereof and opens at the bolt head. The oil feed passage 59 is provided, on the opening side thereof, with an oil reservoir 60 which is formed inside the magnetocover 31, and is configured to have a fluid-tight structure with the aid of a seal or a packing 61. The oil reservoir 60 is fed with the oil through an oil passage (not illustrated) formed in the magnetocover 31 from the main gallery 53.

Inside the crankshaft 15, there are formed oil passages 62 (62A to 62H) so as to extend from the first journal portion 54A on one end to the fifth journal portion 54E on the other end. The oil passages 62 are formed by machining (drilling) in the vicinity of the individual crank pins 15*c*, and the opening of each individual oil passage 62 is closed by a plug 63.

Every adjacent oil passages 62 cross at an inner portion of the crank pins 15*c*, wherein crank pin paths 64 are formed at the individual intersections. More specifically, a crank pin path 64 is formed at the intersection of the oil passage 62A and the oil passage 62B, a crank pin path 64B at the intersection of the oil passage 62B and the oil passage 62C, a crank pin path 64C at the intersection of the oil passage 62D and the oil passage 62E, and a crank pin path 64D at the intersection of the oil passage 62D and the oil passage 62E, respectively so as to penetrate the crank pin 15*c* in the radial direction, and so as to supply the oil from the individual crank pin paths 64 to the individual crank pin bearings 65.

Machining for forming the oil passages 62 may be effected in the direction nearly orthogonal to the chamfered portion formed on the crank webs 15*a*, 15*b* on the sides thereof closer to the crank pins 15*c*. Since it is difficult to form thereon the chamfered portions on the crank web 15*a* of cylinder #2, and on the crank web 15*b* of cylinder #4, due to a secondary balancer drive gear 66 and a primary drive gear 67 respectively attached thereto, so that the machining is obliquely effected to the base portion of the crank webs 15*a*, 15*b*, rather than orthogonally to the chamfered portions. Since the primary drive gear 67, in particular, is formed to have a smaller diameter and a larger thickness as compared with the secondary balancer drive gear 66, so that the oil passage 62F is drilled in the direction appropriately inclined relative to the oil passage 62E, so as to communicate the both in midway of the path, as illustrated in FIG. 5.

On the other hand, the crankshaft 15 has the starter clutch device 29 attached to the right end thereof, as described in the above. The starter clutch device 29 has a clutch-inner attached with a ring gear 70 which engages with the reduction gear train 28, and a clutch-outer 69 connectable with the clutch-inner 68 while placing an one-way clutch 71 in between. The clutch-inner 68 and the clutch-outer 69 have cylindrical boss portions 68*a*, 69*a*, respectively, between which a needle bearing 72 is interposed. These objects to be attached, including a sensor rotor 73, are attached with the aid of an attaching (or fastening) bolt 75 to the right end of the crankshaft 15, so as to be held between washers 74, 74'. On the left side of the starter clutch device 29, there is disposed a cam chain sprocket or a cam chain drive sprocket 76 (object to be attached) around which a cam chain for rotating the cam shaft is wound.

Now, among the oil passages 62 formed in the crankshaft 15 as described in the above, the oil passage 62H which serves as the downstream end of oil path has a discharge passage 77 communicated therewith. The oil discharge passage 77 opens at the other end (right end) of the crankshaft 15. In the present invention, the attaching bolt 75 is particularly provided, so as to form the oil discharge passage 77 therein.

Figure 6A:
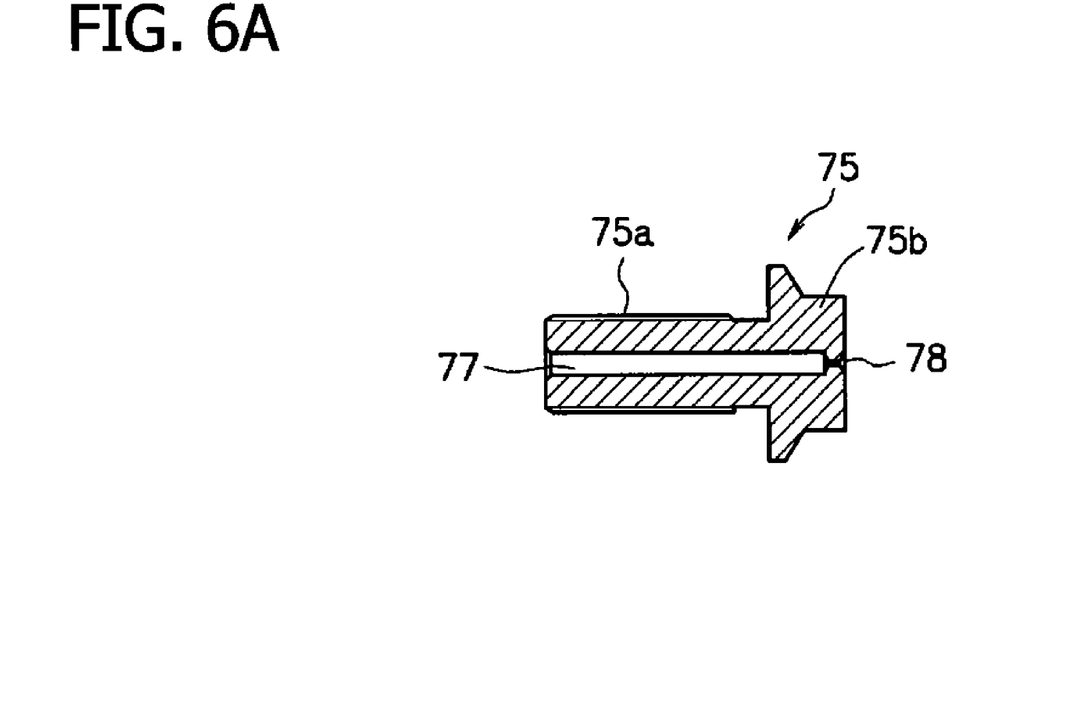
FIG. 6A is a sectional view illustrating an exemplary configuration of an oil discharge passage according to the present invention.

FIG. 6A illustrates an exemplary specific configuration of the attaching bolt 75 of this embodiment. The attaching bolt 75 has a threaded portion 75*a* to be screwed with the end of the crankshaft 15, and has an opening 78 of the oil discharge passage 77 opened in a bolt head 75*b*, or the head thereof. In this configuration, the cross-sectional area of the opening 78 is set smaller than the cross-sectional area of the oil discharge passage 77. The opening 78 may be coaxial with the oil discharge passage 77, and may be chamfered so as to expand the diameter towards the end.

In this configuration, the attaching bolt 75 is used for fastening objects to be attached to the other end of the crankshaft 15, and has at least the cam chain drive sprocket 76 and the starter clutch device 29 as the objects to be attached as described in the above. The objects to be attached may typically be other components in need of lubrication or cooling of oil, such as AC generator 30, rather than the cam chain drive sprocket 76 and the starter clutch device 29.

The oil discharge passage 77 opens, as illustrated in FIG. 5, so as to oppose with the inner surface of the clutch cover 33 which externally covers the other end of the crankshaft 15.

In this configuration, the engine starts by activating the starting motor 25. In this process, a fuel mixture produced by the fuel injector 116 is supplied to the engine unit 10, the reciprocating motion of the pistons 18 is converted through the connecting rods 20 into rotational motion of the crankshaft 15, and thereby engine output may be obtained. Upon starting of the engine, also the cooling water cooling system and the oil lubrication system come into operation.

In the oil lubrication system, the oil fed to the main gallery 53 with the aid of operation of the oil pump 45 is then supplied to individual components of the engine. In particular in the crank-end lubrication system according to the present invention, the oil is first fed at one end of the crankshaft 15 into the oil feed passage 59. In the process of flowing in the crankshaft 15 along the oil passage 62, the oil is supplied through the crank pin paths 64A to 64D towards the crank pin 15*c* of the individual cylinders #1 to #4. The oil further flows through the oil passage 62H to reach the oil discharge passage 77, and then discharged out through the opening 78.

In the present invention, the oil supplied from one end of the crankshaft 15 flows through the oil passage 62 in the crankshaft 15, and finally discharged through the oil discharge passage 77 and out from the opening 78. According to the present invention, the air remained in the oil passages 62 may exactly be discharged, even when the crank-end lubrication system is adopted to the multi-cylinder engine.

The oil discharge passage 77 is formed making use of the attaching bolt 75, and is formed therein. By forming the oil discharge passage 77 in the attaching bolt 75 in this way, any possible modifications in the specification with respect to air-bleeding performance and amount of oil discharge may flexibly be coped with, if a plurality of types of attachment bolts having different cross-sectional areas of the oil discharge passage 77 is preliminarily obtained.

By using the attaching bolt 75, aimed at fastening an object to be attached such as the cam chain drive sprocket 76, also as the oil discharge passage 77, the structure may be simplified, and the number of necessary components may be reduced.

By setting the cross-sectional area of the opening 78 smaller than the cross-sectional area of the oil discharge passage 77, the diameter of the air-bleeding hole may be shrunk. Since the amount of discharge of oil from the opening 78 may be adjustable, and in particular reducible, so that the crank pin bearings 65 may be supplied only with a necessary-and-sufficient amount of oil. As a consequence, any lubrication failure of the crank pin bearings 65 may always be prevented, and thereby an excellent lubrication performance may be ensured.

The oil discharge passage 77 formed in the attaching bolt 75 opens so as to oppose the inner surface of the clutch cover 33. By virtue of this configuration, the oil discharged from the oil discharge passage 77 collides against the inner surface of the clutch cover 33 to form a mist, which improves the lubrication performance exerted on the objects to be attached.

In this configuration, at one end of the crankshaft 15, there is provided an oil reservoir 60 on the side where the oil feed passage 59 opens, and the oil is supplied to the oil reservoir 60 through the main gallery 53. By providing the oil reservoir 60, the oil may exactly be supplied to one end of the crankshaft 15.

Now, the oil feed structure of the crank-end lubrication system according to the present invention will further be detailed. By providing the opening 78, which functions as an air-bleeding hole, at the other end of the crank shaft 15 located on the downstream end of the oil feed passage 59, retention of air in the oil passage may exactly be prevented. In this viewpoint, the configuration takes various advantages over a hypothetical configuration which disuses the oil passage on the downstream side so as to allow air-bleeding simply from the end.

When the crankshaft 15 rotates at high speed, centrifugal force is exerted on the oil in the oil passage 62. The oil having a specific density larger than that of the air then moves outwardly in the radial direction of the crankshaft 15, meanwhile the air moves to the center of the crankshaft. In this way, the air may exactly be discharged through the oil discharge passage formed to the center of the crankshaft 15.

Assuming now that the oil passages 62G, 62H were disused, the air may accumulate and may form an air reservoir at the center of the crankshaft 15 which locates on the upstream of the oil passage 62F, more specifically at around the middle point of the oil passage 62E. In contrast in the present invention, since the oil discharge passage 77 is formed at the center of the crankshaft 15, and also the oil passages 62G, 62H are formed, so that the air remained in the oil passage 62 may be pushed out by the oil fed into the oil passage 62 after the engine starts, and thereby the air may be discharged through the oil passages 62G, 62H and out from the oil discharge passage 77.

For a hypothetical case where the oil passages 62G, 62H were disused, the air may be discharged out from the end of the oil passage 62F together with the air into the crankcase 12. The configuration may undesirably increase the amount of oil discharged into the crankcase 12, and may thereby increase friction of the crankshaft 15, and degrade gas-liquid separation performance in the breather chamber due to increase in the oil content in the breather chamber.

In contrast in the present invention, by virtue of the structure configured to discharge the oil out from the other end of the crankshaft 15 which projects outwardly from the right wall of the crankcase 12, the crankcase 12 is successfully prevented from being discharged with an excessive oil. Accordingly, friction of the crankshaft 15 may be reduced, and the gas-liquid separation performance of the breather chamber may be improved.

By virtue of the structure of the present invention, which allows oil discharge out from the other end of the crankshaft 15, the discharged oil may be dispersed in a form of mist in the clutch cover 33, and may thereby moderately lubricate the object to be attached (cam chain drive sprocket 76, starter clutch 29 and so forth) attached to the other end of the crankshaft 15.

For the inventive case having the cam chain drive sprocket 76 attached to the other end of the crankshaft 15, and the starter clutch 29 disposed further beyond, the oil discharged from the air-bleeding hole collides against the inner surface of the clutch cover 33 to form a mist, and may effectively lubricate the cam chain drive sprocket 76, despite the cam chain drive sprocket 76 is disposed apart from the air-bleeding hole and even behind the starter clutch 29.

Figure 6B:
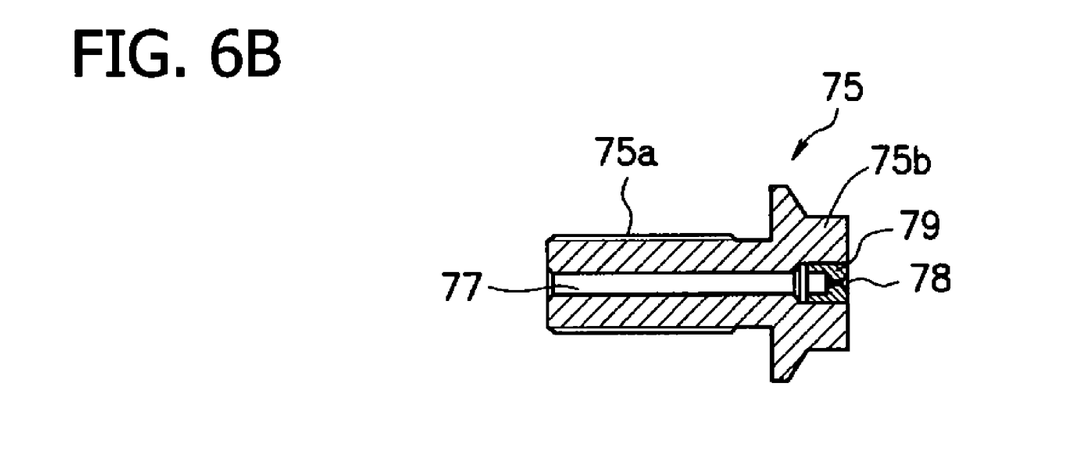
FIG. 6B is a sectional view illustrating exemplary configuration of the oil discharge passage according to the present invention.

Next, a modified example of the present invention will be explained. FIG. 6B illustrates another exemplary configuration of the oil discharge passage 77. As illustrated in FIG. 6B, the oil discharge passage 77 has the opening 78 in the bolt head 75b of the attaching bolt 75. In this configuration, the bolt head 75b has a sleeve 79 fitted therein, and the opening 78 is formed in the sleeve 79. The sleeve 79 may be fixed to the bolt head 75b, or may be configured to be attachable and detachable to or from the bolt head 75b. Other aspects of the configuration may be essentially same as those described in the above.

In this configuration, a plurality of types of sleeves 79 having different cross-sectional areas of the oil discharge passage 77 are preliminarily obtained, and any of which matched to a desired specification may be selected for use.

Figure 7:
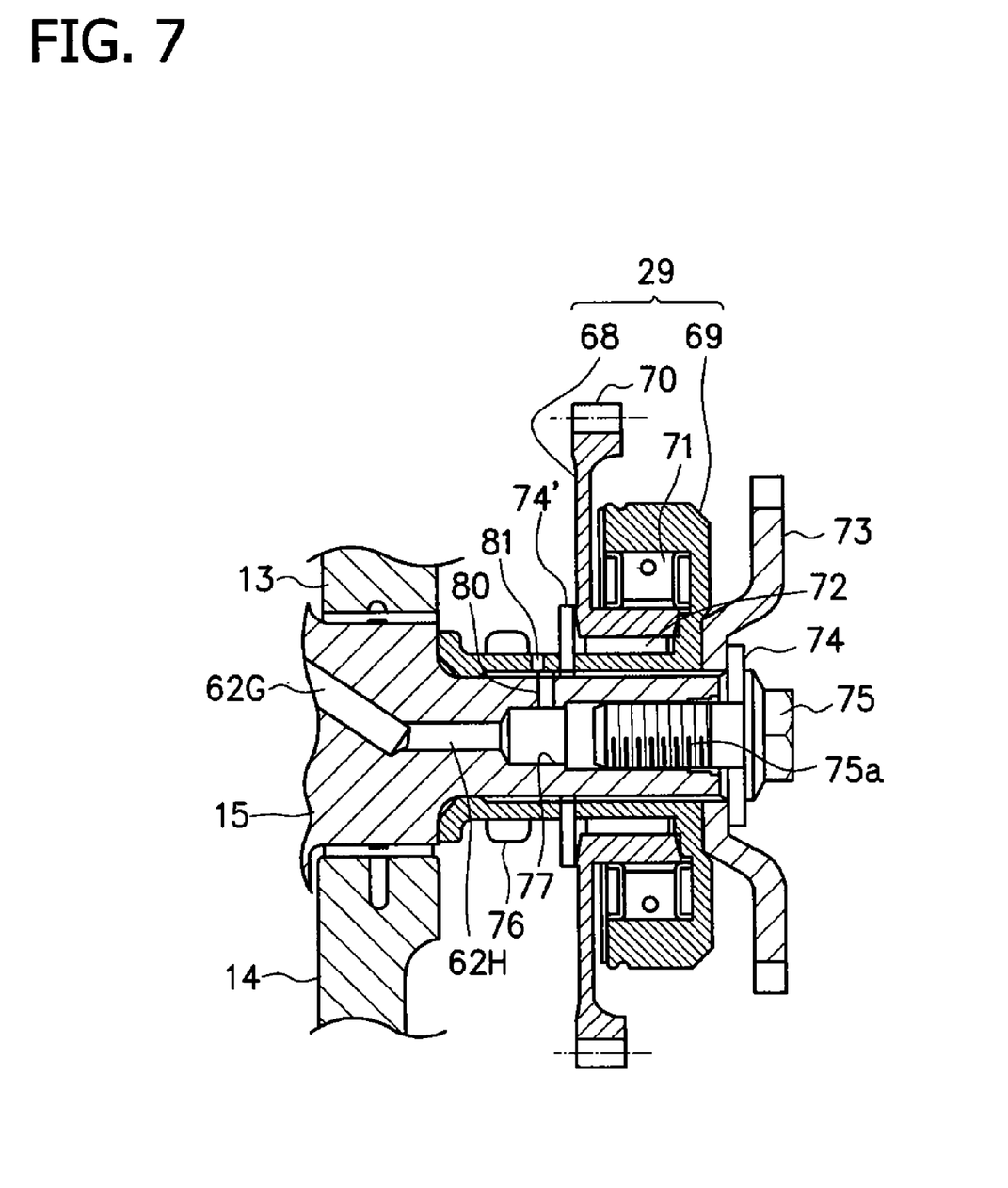
FIG. 7 is a sectional view illustrating a modified example of the oil discharge passage according to the present invention.

Next, FIG. 7 illustrates still another exemplary configuration of the oil discharge passage 77. In this configuration, the oil discharge passage 77 has an opening 80 which opens on the outer circumferential surface of the other end of the crankshaft 15, wherein the opening 80 is externally covered with the cam chain drive sprocket 76 which is attached to the other end of the crankshaft 15. The opening 80 is configured to communicate with an air-bleeding hole 81 which is formed to the cam chain drive sprocket 76.

In the illustrated example in FIG. 7, the center axis of the opening 80 and the center axis of the air-bleeding hole 81 are offset from each other. In this configuration, the cross-sectional area of the communicated portion between the opening 80 and the air-bleeding hole 81 is set smaller than the cross-sectional area of the opening 80. Typically, provision of only a single opening 80 and a single air-bleeding hole 81 may be acceptable enough, but pluralities of those may optionally be provided depending on desired specification.

Alternatively, the opening 80 and the air-bleeding hole 81 may coaxially be disposed rather than being offset, and the cross-sectional area of the air-bleeding hole 81 may be set smaller than the cross-sectional area of the opening 80.

In these examples, the oil discharged from the other end of the crankshaft 15 is supplied mainly to the cam chain drive sprocket 76 disposed in the vicinity of the opening 80 or the air-bleeding hole 81. By discharging the oil in this way, the cam chain may efficiently be lubricated. In this configuration, by appropriately setting the positional relation between the opening 80 and the air-bleeding hole 81 or the cross-sectional areas of the both, the air-bleeding hole 81 may be provided with a throttle mechanism by a simple configuration.

For the case where the opening 80 and the air-bleeding hole 81 are provided in this way, they may be used also in combination with the above-described opening 78 provided to the bolt head 75b of the attaching bolt 75.

The present invention has been explained referring to various embodiments. Note that the present invention is not limited to the above-described embodiments, and may be modified without departing from the scope thereof.

For example, the bolt head 75b, which was explained in the above as the one having a single opening 78 arranged coaxially with the oil discharge passage 77, is not limited thereto, and instead allows provision of a plurality of openings 78 radially arranged around the axis of the oil discharge passage 77.

The present invention, having been explained while referring in particular to a multi-cylinder engine, may efficiently be adoptable also to a single-cylinder engine. Any of these cases may give effects same as those obtained in the above-described embodiments.

What is claimed is:

1. An oil passage structure of an engine comprising:
   a plurality of cylinders, each of the cylinders containing a piston configured to reciprocate in the cylinder;
   a crankcase;
   a crankshaft rotatably supported in the crankcase via journal bearings, each of which is supplied with oil through a journal portion path connected to a main gallery;
   an engine accessory attached at a first end of the crankshaft, being a dynamo, including a rotor which rotates together with the crankshaft and a stator coil fixedly attached to an engine accessory cover; and
   a plurality of connecting rods, a first end of each connecting rod being coupled to the crankshaft and a second end of each connecting rod being coupled to one of the pistons, wherein
   the crankshaft comprises:
   an oil feed passage opened at the first end of the crankshaft;
   an oil passage in communication with the oil feed passage, and allowing therethrough feeding of oil to the first ends of the connecting rods; and
   an oil discharge passage in communication with a downstream end of the oil passage, and opened at a second end of the crankshaft,
   the crankshaft is fastened, on the first end thereof with the rotor of the engine accessory, by a fastening bolt,
   the fastening bolt for fastening the engine accessory has the oil feed passage formed therein, and
   the fastening bolt for fastening the engine accessory is in communication, at a head thereof, with an oil reservoir provided to the engine accessory cover which covers the engine accessory.

2. The oil passage structure of an engine according to claim 1, wherein the crankshaft has a fastening bolt fastened at the second end thereof, and the oil discharge passage is formed in the fastening bolt.

3. The oil passage structure of an engine according to claim 2, wherein the fastening bolt has, at a head portion thereof, an opening of the oil discharge passage, and a cross-sectional area of the opening is set smaller than a cross-sectional area of the oil discharge passage.

4. The oil passage structure of an engine according to claim 2, wherein the fastening bolt is provided for fastening an object to be attached to the second end of the crankshaft, and the object is selected from a group consisting of a cam chain sprocket and a starter clutch.

5. The oil passage structure of an engine according to claim 3, wherein the fastening bolt is provided for fastening an object to be attached to the first end of the crankshaft, and the object is selected from a group consisting of a cam chain sprocket and a starter clutch.

6. The oil passage structure of an engine according to claim 4, wherein the oil discharge passage opens so as to be opposed with an inner surface of a cover component which externally covers the second end of the crankshaft.

7. The oil passage structure of an engine according to claim 5, wherein the oil discharge passage opens so as to be opposed with an inner surface of a cover component which externally covers the second end of the crankshaft.

8. The oil passage structure of an engine according to claim 4, wherein the oil discharge passage has an opening which opens on an outer circumferential surface of the second end of the crankshaft, and the opening is externally covered with a cam chain sprocket which is attached to the second end of the crankshaft, and is in communication with an air-bleeding hole which is formed in the cam chain sprocket.

9. The oil passage structure of an engine according to claim 8, wherein the opening and the air-bleeding hole are disposed coaxially, and a cross-sectional area of the air-bleeding hole is smaller than a cross-sectional area of the opening.

10. The oil passage structure of an engine according to claim 8, wherein a center axis of the opening and a center axis of the air-bleeding hole are offset from one another, and a cross-sectional area of a portion of the opening and the air-bleeding hole that are in communication with one another is smaller than the cross-sectional area of the opening.

\* \* \* \* \*